US008995681B2

(12) United States Patent
Kimura et al.

(10) Patent No.: US 8,995,681 B2

(45) Date of Patent: Mar. 31, 2015

(54) AUDIO PROCESSING APPARATUS WITH NOISE REDUCTION AND METHOD OF CONTROLLING THE AUDIO PROCESSING APPARATUS

(75) Inventors: Masafumi Kimura, Kawasaki (JP); Fumihiro Kajimura, Kawasaki (JP); Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 593 days.

(21) Appl. No.: 13/357,257

(22) Filed: Jan. 24, 2012

(65) Prior Publication Data

US 2012/0207315 A1 Aug. 16, 2012

(30) Foreign Application Priority Data

Feb. 10, 2011 (JP) ................................ 2011-027843

(51) Int. Cl.
*H04B 15/00* (2006.01)
*H04R 5/04* (2006.01)
(Continued)

(52) U.S. Cl.
CPC .................. *H04R 5/04* (2013.01); *H04R 3/005* (2013.01); *G10L 21/0208* (2013.01); *G10L 2021/02165* (2013.01); *G10L 21/034* (2013.01); *H04R 1/245* (2013.01); *H04R 2410/07* (2013.01); *H04R 2430/01* (2013.01); *H04R 5/027* (2013.01); *H04S 2400/15* (2013.01)
USPC ........................... 381/94.1; 381/359; 381/365

(58) Field of Classification Search
CPC ........... H04R 2420/05; H04R 2420/07; H04R 2410/05; H04R 2410/07; H04R 3/005; H04R 1/086
USPC .......... 381/91–92, 94.1–94.3, 94.7, 320, 355, 381/359, 365, 189
See application file for complete search history.

(56) References Cited

U.S. PATENT DOCUMENTS

2007/0058822 A1* 3/2007 Ozawa ........................ 381/94.1
2008/0219470 A1 9/2008 Kimijima
(Continued)

FOREIGN PATENT DOCUMENTS

CN 1877517 A 12/2006
CN 1933677 A 3/2007
(Continued)

OTHER PUBLICATIONS

Feb. 20, 2014 Chinese Office Action, that issued in Chinese Patent Application No. 201210030365.X.
(Continued)

*Primary Examiner* — Joseph Saunders, Jr.
*Assistant Examiner* — James Mooney
(74) *Attorney, Agent, or Firm* — Cowan, Liebowitz & Latman, P.C.

(57) ABSTRACT

An audio processing apparatus includes first and second audio pickup units. The second audio pickup unit includes an audio resistor provided to cover a sound receiving portion to suppress external wind introduction while passing an external audio. A first filter attenuates a signal having a frequency lower than a first cutoff frequency of the output signal of a first A/D converter. A second filter attenuates a signal having a frequency higher than a second cutoff frequency of the output signal of a second A/D converter. A third filter is provided between the first audio pickup unit and the first A/D converter to attenuate a signal having a frequency lower than a third cutoff frequency for suppressing the wind noise.

10 Claims, 13 Drawing Sheets

(51) Int. Cl.

| | |
|---|---|
| ***H04R 3/00*** | (2006.01) |
| ***G10L 21/034*** | (2013.01) |
| *G10L 21/0208* | (2013.01) |
| *G10L 21/0216* | (2013.01) |
| *H04R 1/24* | (2006.01) |
| *H04R 5/027* | (2006.01) |

(56) References Cited

U.S. PATENT DOCUMENTS

| | | | | |
|---|---|---|---|---|
| 2009/0232328 | A1* | 9/2009 | DeLine et al. | 381/86 |
| 2009/0299739 | A1 | 12/2009 | Chan et al. | |

FOREIGN PATENT DOCUMENTS

| | | | | |
|---|---|---|---|---|
| CN | 101356849 | A | | 1/2009 |
| JP | 05014989 | | * | 1/1993 |
| JP | 09-065482 | A | | 3/1997 |
| JP | 10-257582 | A | | 9/1998 |
| JP | 2007-081560 | A | | 3/2007 |
| JP | 2008-129107 | | | 6/2008 |
| JP | 2008-538882 | A | | 11/2008 |
| JP | 2009-036831 | A | | 2/2009 |

OTHER PUBLICATIONS

Oct. 27, 2014 Japanese Office Action, that issued in Japanese Patent Application No. 2011-027843.

* cited by examiner

AUDIO PROCESSING APPARATUS WITH NOISE REDUCTION AND METHOD OF CONTROLLING THE AUDIO PROCESSING APPARATUS

BACKGROUND OF THE INVENTION

1. Field of the Invention

The present invention relates to an audio processing apparatus and a method of controlling the audio processing apparatus.

2. Description of the Related Art

Video cameras, IC recorders, and the like are conventionally known as audio processing apparatuses. In these audio processing apparatuses, an audio signal acquired from a microphone may contain noise due to the influence of wind. As a countermeasure, some apparatuses provide a gain controller before an A/D converter to prevent an audio signal that has passed through the A/D converter from being saturated, and also remove low-frequency components to reduce wind noise in the audio signal that has passed through the A/D converter. For example, Japanese Patent Laid-Open No. 2008-129107 discloses a method of obtaining a high-quality audio by providing a gain controller before an A/D converter and also providing a gain controller after a low-frequency removing unit for wind noise processing.

However, in the conventional technique disclosed in Japanese Patent Laid-Open No. 2008-129107, the quantization error may become large upon gain control after wind noise processing. For example, according to the method of Japanese Patent Laid-Open No. 2008-129107, when the gain controller increases the gain, the quantization error of the above-described A/D converter becomes large.

SUMMARY OF THE INVENTION

The present invention provides a high-quality audio by suppressing an increase in the quantization error by gain control after wind noise processing.

According to an aspect of the present invention, an audio processing apparatus includes a first audio pickup unit, a second audio pickup unit including an audio resistor provided to cover a sound receiving portion to suppress external wind introduction while passing an external audio, a first A/D converter that digitizes an output signal from the first audio pickup unit, a second A/D converter that digitizes an output signal from the second audio pickup unit, a level controller that controls at least one of a signal level of an output signal of the first A/D converter and a signal level of an output signal of the second A/D converter, a first filter that attenuates a signal having a frequency lower than a first cutoff frequency of the output signal of the first A/D converter, a third filter that attenuates a signal having a frequency higher than a second cutoff frequency of the output signal of the second A/D converter, an adder that adds an output signal of the first filter and an output signal of the third filter to output an audio with reduced wind noise, and a second filter provided between the first audio pickup unit and the first A/D converter to attenuate a signal having a frequency lower than a third cutoff frequency for suppressing the wind noise.

According to the present invention, it is possible to provide a high-quality audio by suppressing an increase in the quantization error by gain control after wind noise processing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

First Embodiment

An audio recorder serving as an audio processing apparatus and an image capture device including the audio recorder according to the first embodiment of the present invention will be described below with reference to FIGS. 1 to 11A and 11B.

Figure 1:
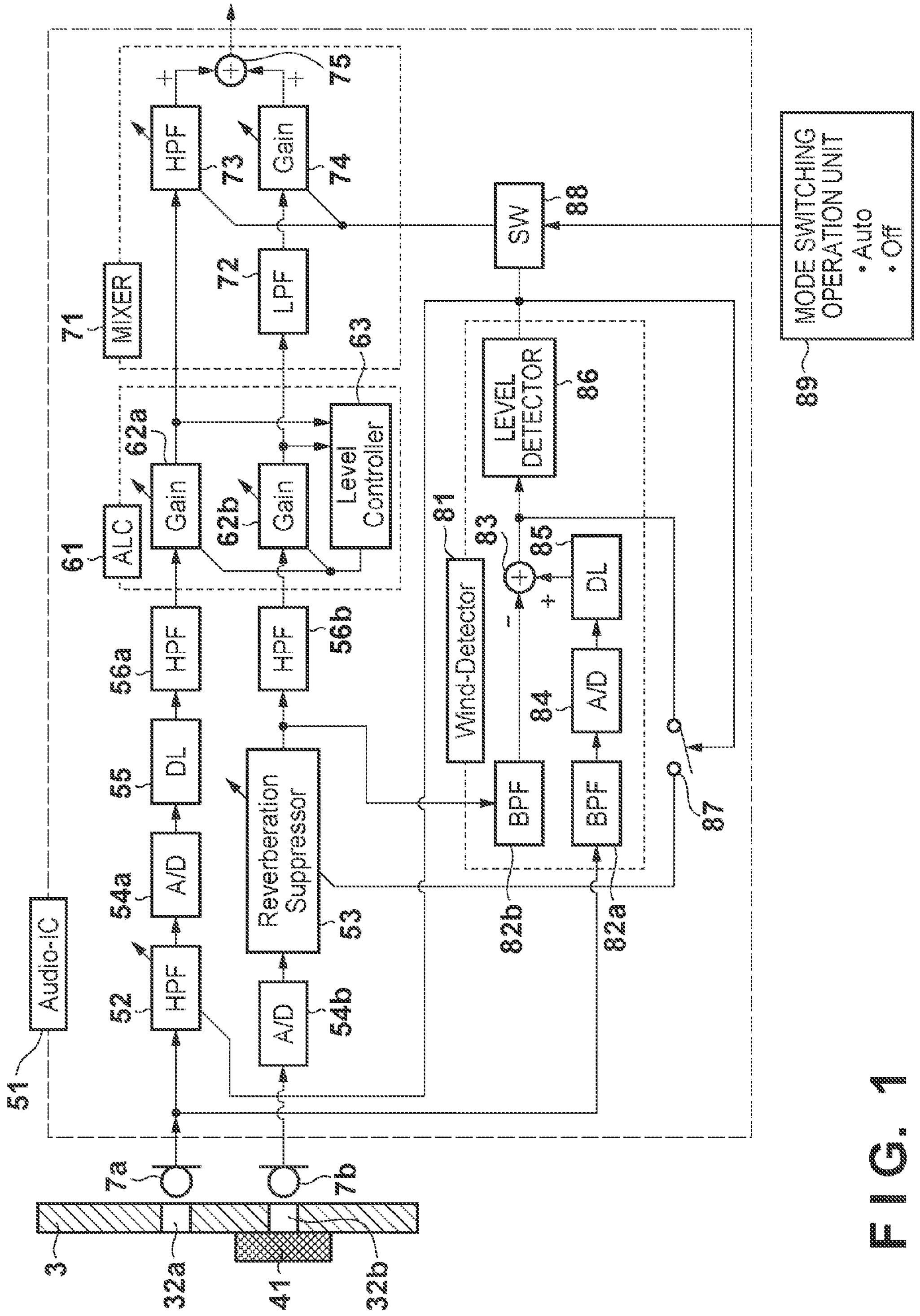
FIG. 1 is a block diagram showing the arrangement of an audio recorder according to an embodiment.
Figure 2A:
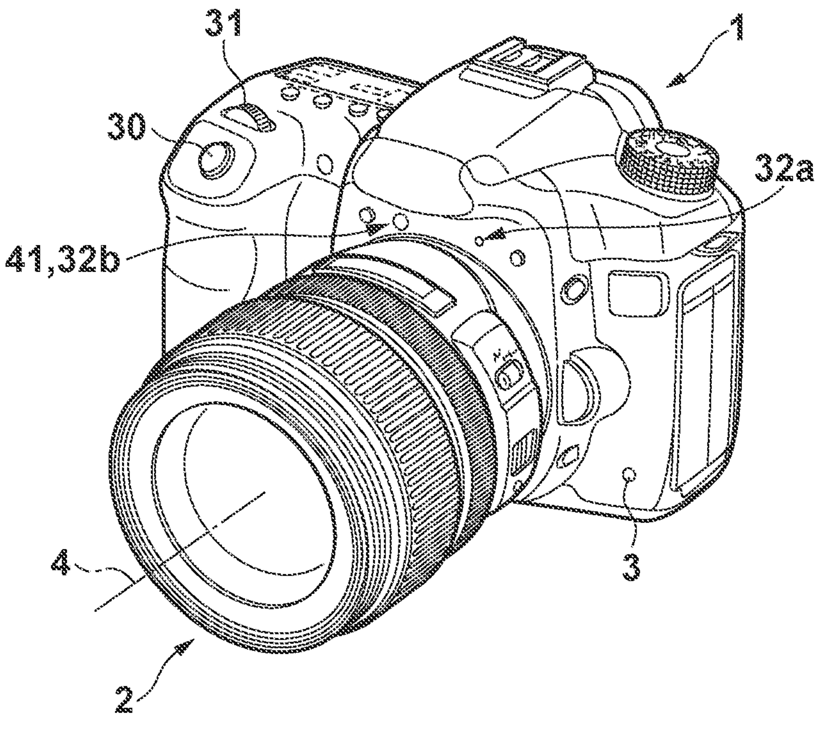
FIGS. 2A and 2B are perspective and sectional views, respectively, showing an image capture device.
Figure 2B:
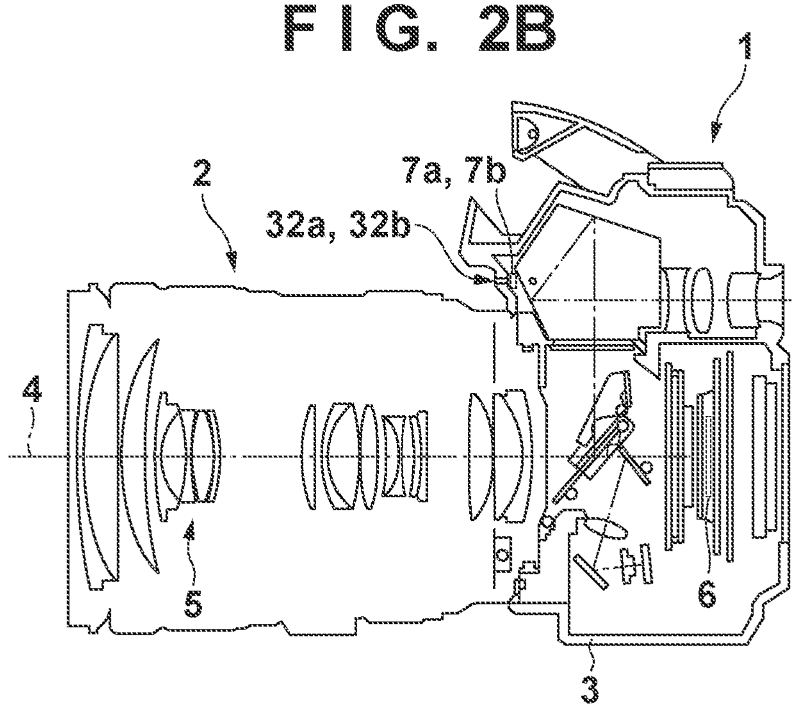

FIG. 1 is a block diagram showing the arrangement of the audio recorder according to this embodiment. FIGS. 2A and 2B are perspective and sectional views, respectively, showing the image capture device (camera) including the audio recorder shown in FIG. 1. Reference numeral 1 denotes an image capture device; 2, a lens attached to the image capture device 1; 3, a body of the image capture device 1; 4, an optical axis of the lens; 5, a photographing optical system; and 6, an image sensor. Reference numeral 30 denotes a release button; and 31, an operation button. A first microphone 7*a* and a second microphone 7*b* are provided in the image capture device 1. Opening portions 32*a* and 32*b* are provided in the body 3 for the microphones 7*a* and 7*b*, respectively. An audio resistor 41 for suppressing wind introduction while passing external audio is pasted to the opening portion 32*b* to cover the sound receiving portion of the microphone 7*b*. The audio resistor 41 can also be formed by making the body 3 have an uneven thickness or using an extra part, as will be described later. The image capture device 1 can simultaneously perform image acquisition and audio recording using the microphones 7*a* and 7*b*.

The moving image shooting operation of the image capture device 1 will be explained. When the user presses a live view button (not shown) before moving image shooting the image on the image sensor 6 is displayed on a display device provided in the image capture device 1 in real time. In synchronism with the operation of a moving image shooting button, the image capture device 1 obtains object information from the image sensor 6 at a set frame rate and audio information from the microphones 7*a* and 7*b* simultaneously, and synchronously records these pieces of information in a memory (not shown). Shooting ends in synchronism with the operation of the moving image shooting button.

The arrangement of an audio processing apparatus 51 will be described with reference to FIG. 1. Reference numeral 52 denotes an analog high-pass filter (HPF) configured to change the cutoff frequency; 53, a reverberation suppressor formed from, for example, a reverberation suppression adaptive filter; 54*a* and 54*b*, first A/D converters (ADCs) that digitize the signals output from the microphones; 55, a first delay device (DL) 55; and 56*a* and 56*b*, DC component cutting HPFs.

Reference numeral 61 denotes an automatic level controller (ALC). The ALC 61 includes variable gains 62*a* and 62*b* for level control, and a level controller 63.

A mixer 71 mixes the signal of the first microphone 7*a* and signal of the second microphone 7*b*. The mixer 71 includes a low-pass filter (LPF) 72, an HPF 73 configured to change the cutoff frequency, a gain multiplier 74, and an adder 75.

Reference numeral 81 denotes a wind-detector. The wind-detector 81 includes bandpass filters (BPFs) 82*a* and 82*b*, a subtracter 83, a second A/D converter (ADC) 84, a second delay device 85, and a level detector 86.

Reference numeral 87 denotes a switch that controls the reverberation suppressor 53; 88, a switch that controls the mixer 71; and 89, a mode switching operation unit.

Needless to say, a high-pass filter attenuates a signal having a frequency lower than a predetermined frequency but does not attenuate a signal having a frequency higher than the predetermined frequency. Thus, the high-pass filter attenuates, out of an input signal, signal components having frequencies lower than a predetermined frequency more than those having frequencies higher than the predetermined frequency. The predetermined frequency is called a cutoff frequency. Similarly, a low-pass filter attenuates a signal having a frequency higher than a predetermined frequency but does not attenuate a signal having a frequency lower than the predetermined frequency. Thus, the low-pass filter attenuates, out of an input signal, signal components having frequencies higher than a predetermined frequency more than those having frequencies lower than the predetermined frequency. The predetermined frequency is called a cutoff frequency. A bandpass filter attenuates signals outside a predetermined frequency range but does not attenuate signals within the predetermined frequency range. Thus, the bandpass filter attenuates signals outside a predetermined frequency range more than those within the predetermined frequency range. In other words, these filters extract signals having desired frequencies.

Referring to FIGS. 1, 2A, and 2B, the opening portions 32*a* and 32*b* for the microphones are provided in the body 3. The audio resistor 41 that covers the second microphone 7*b* is provided on the opening portion 32*b* to mask movement of air from the outside of the apparatus to the second microphone 7*b*. On the other hand, the opening portion 32*a* is not provided with such an audio resistor so that the first microphone 7*a* can faithfully acquire an object sound. The audio resistor 41 is provided in tight contact with the body 3. The movement of air is here assumed to be air movement by wind. For example, a material such as porous PTFE that allows air to move more slowly than air moved by wind but does not allow the wind to pass through can also be used as the audio resistor.

In the audio processing apparatus 51, the signal from the first microphone 7*a* is processed by the HPF 52 and then undergoes analog/digital conversion (A/D conversion) of the ADC 54*a*. The first delay device 55 delays the output from the ADC 54*a* by an appropriate amount. On the other hand, in the audio processing apparatus 51, the signal from the second microphone 7*b* is A/D-converted by the ADC 54*b* and then undergoes reverberation suppression of the reverberation suppressor 53. The operation of the reverberation suppressor 53 and how to cause the first delay device 55 to apply a delay will be described later.

The outputs from the first delay device 55 and the ADC 54*b* are processed by the DC component cutting HPFs 56*a* and 56*b*, respectively. The HPFs 56*a* and 56*b* aim at removing the offset of the analog part and need only remove components below the audible range from the DC. To do this, the cutoff frequency of the HPFs 56*a* and 56*b* is set to, for example, about 10 Hz.

The outputs from the HPFs 56*a* and 56*b* are input to the ALC 61 and undergo gain control of the variable gains 62*a* and 62*b*. At this time, the gain of at least one of the variable gains 62*a* and 62*b* is controlled such that, for example, the two signal levels of, 2 kHz that is a frequency lower than that of the HPF 56 become identical. The level controller 63 receives the outputs from the variable gains 62*a* and 62*b* and appropriately controls the levels so as to effectively use the dynamic range without causing saturation. At this time, the level controller 63 performs level control not to cause saturation of a larger one of the outputs from the variable gains 62*a* and 62*b*.

The outputs from the variable gains 62*a* and 62*b* are input to the mixer 71. The output from the variable gain 62*a* is passed through the HPF 73 and sent to the adder 75. On the other hand, the output from the variable gain 62*b* is sent to the adder 75 via the LPF 72 and the variable gain 74. The output mixed by the adder 75 is output as the audio after wind noise processing.

The output from the first microphone 7*a* and the output from the reverberation suppressor 53 are input to the BPFs 82*a* and 82*b* of the wind-detector 81, respectively. The BPFs 82*a* and 82*b* aim at passing components within the range where the object sound can faithfully be acquired by the second microphone 7*b*. Thus, the passband is set to, for example, about 30 Hz to 1 kHz. However, the upper limit set value of the frequency can be changed by the structure of the audio resistor 41 or the like. Details will be described later together with the frequency characteristic of the second microphone 7*b*.

The output from the BPF 82*a* is A/D-converted by the second ADC 84 and sent to the second delay device 85. How to cause the second delay device 85 to apply a delay will be described later together with the operation of the reverberation suppressor 53.

The subtracter 83 calculates the difference between the outputs from the second delay device 85 and the output from the BPF 82*b* and sends the result to the level detector 86. The operation of the level detector 86 will be described later. The level detector 86 determines the strength of wind, and the switch 87 is controlled to switch feedback to the reverberation suppressor 53. The detection result of the level detector 86 is also used to control the switch 88 for controlling the mixer 71.

When the user sets the mode switching operation unit 89 to OFF, the switch 88 operates to always select processing in the windless state to be described later. On the other hand, when the user sets the mode switching operation unit 89 to Auto, the switch 88 operates to change the cutoff frequencies of the HPF 52 and the HPF 73 and the variable gain 74 in accordance with the wind strength determined by the level detector 86. Details of this processing will be described later.

Figure 3A:
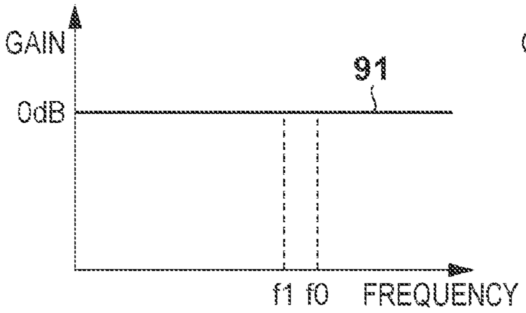
FIGS. 3A to 3F are graphs showing examples of the frequency characteristic of a microphone.
Figure 3B:
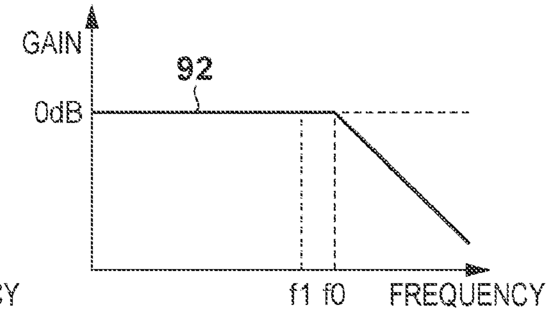
Figure 3C:
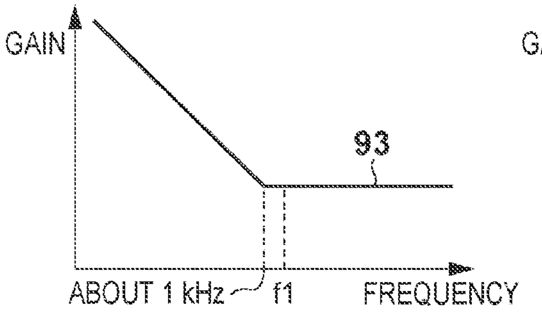
Figure 3D:
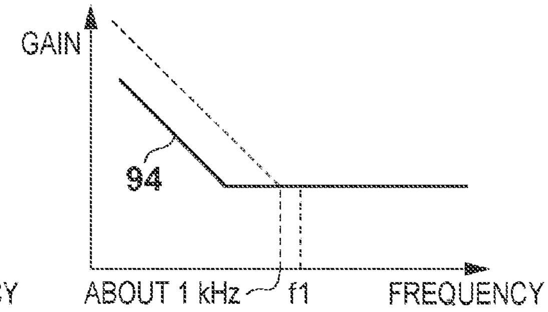
Figure 3E:
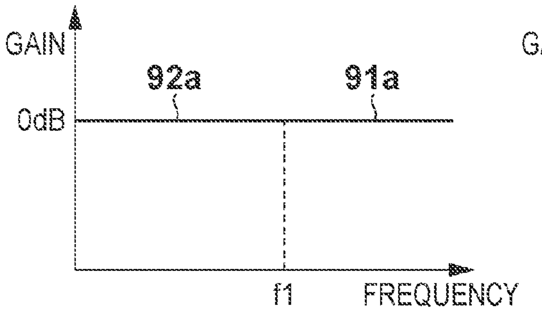
Figure 3F:
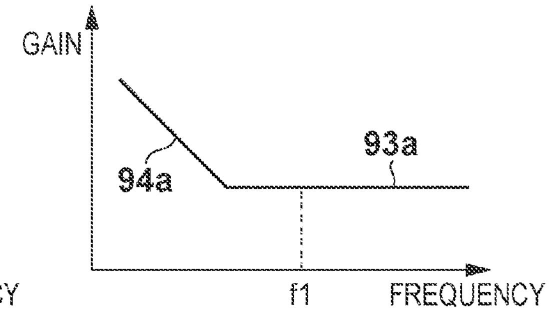

The effects and desired characteristics of the audio resistor 41 and wind noise reduction will be explained with reference to FIGS. 1, 3A to 3F, and 4A to 4D. FIGS. 3A to 3F are graphs schematically showing the frequency characteristic of the microphone. The abscissa represents the frequency, and the ordinate represents the gain. FIG. 3A shows the object sound acquisition characteristic of the first microphone 7*a*. FIG. 3B shows the object sound acquisition characteristic of the second microphone 7*b*. FIG. 3C shows the wind noise acquisition characteristic of the first microphone 7*a*. FIG. 3D shows the wind noise acquisition characteristic of the second microphone 7*b*. FIG. 3E shows the object sound acquisition characteristic of the output of the mixer 71. FIG. 3F shows the wind noise acquisition characteristic of the output of the mixer 71. To clarify the characteristic difference between the first microphone 7*a* and the second microphone 7*b*, the characteristics of the first microphone 7*a* are indicated by the broken lines in FIGS. 3B and 3D. In FIGS. 3A and 3B, f0 represents the structural cutoff frequency by the audio resistor 41, and f1 represents the cutoff frequency of the LPF 72 and the HPF 73 in the mixer 71 shown in FIG. 1.

As shown in FIG. 3A, the object sound acquisition characteristic of the first microphone 7*a* is preferably flat in the audible range. This allows to faithfully acquire the object sound. As shown in FIG. 3B, the second microphone 7*b* has a different characteristic because the audio resistor 41 is provided to mask movement of air from the object. The second microphone 7*b* relatively faithfully passes the audio signal at a frequency lower than the cutoff frequency by the audio resistor 41. This is because the sound that is a compressional wave of air excites the audio resistor 41, and the audio resistor 41 thus excites the air in the apparatus in the same way. On the other hand, the second microphone 7*b* masks the audio signal at a frequency higher than the cutoff frequency by the audio resistor 41. This is because although the sound that is a compressional wave of air excites the audio resistor 41, the density is inverted before the audio resistor 41 starts vibrating, and the air cannot move. Thus, the audio resistor 41 suppresses wind noise and acts as a structural low-pass filter for an audio other than the wind noise. The frequency f0 at which the structural cutoff begins will be referred to as the cutoff frequency of the audio resistor 41.

The power of wind noise is known to concentrate to the lower frequency range. For example, as for the power of wind noise in the first microphone 7*a*, a characteristic that rises from about 1 kHz to the lower frequency side is obtained in many cases, as shown in FIG. 3C. Even if the shape is different from that shown in FIG. 3C, low-frequency components (equal to or lower than 500 Hz) are dominant in the wind noise. As shown in FIG. 3D, the rise of the low-frequency components of wind noise is small in the second microphone 7*b*. Near the first microphone 7*a*, a large atmospheric pressure difference is readily generated because of a turbulent flow or the like. For the second microphone 7*b*, however, such a large atmospheric pressure difference is not caused by a turbulent flow or the like because the audio resistor 41 is provided to mask movement of air from the object. This is the reason why the rise of the low-frequency components of wind noise is small in the output of the second microphone 7*b*.

Consider processing of these signals by the mixer 71. As described above with reference to FIG. 1, the signal of the first microphone 7*a* is processed by the HPF 73. This corresponds to cutting a portion 91 in FIG. 3A and a portion 93 in FIG. 3C. The signal of the second microphone 7*b* is processed by the LPF 72. This corresponds to cutting a portion 92 in FIG. 3B and a portion 94 in FIG. 3D. When passing through the adder 75, an object sound characteristic as shown in FIG. 3E is obtained, and a wind noise characteristic as shown in FIG. 3F is obtained. The portions 91, 92, 93, and 94 are dominant at portions 91*a*, 92*a*, 93*a*, and 94*a* shown in FIGS. 3E and 3F. Note that the expression "dominant" is used because the counterpart is not necessarily zero because of the characteristics of the LPF 72 and the HPF 73. As is apparent from FIGS. 3E and 3F, the output of the mixer 71 has a flat object sound characteristic in the audible range and a wind noise characteristic equal to the characteristic of the microphone provided with the audio resistor 41.

FIGS. 4A to 4D illustrate examples of the attachment structure of the microphones. Referring to FIGS. 4A to 4D, reference numerals 33*a* and 33*b* denote holding elastic bodies of the first microphone 7*a* and the second microphone 7*b* respectively; and 34, a sleeve that holds the second microphone 7*b* and the audio resistor 41.

Figure 4A:
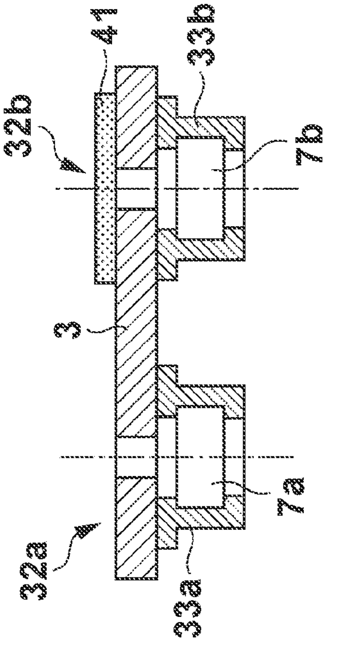
FIGS. 4A to 4D are views for explaining the attachment structure of microphones.

FIG. 4A shows an example in which the audio resistor 41 is pasted outside the body 3. In the example of FIG. 4A, the audio resistor 41 can be pasted after the apparatus has been assembled. This enables to improve the assembling efficiency.

Figure 4B:
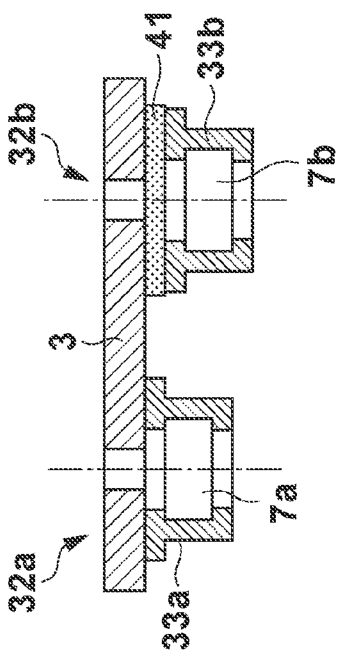

FIG. 4B shows an example in which the audio resistor 41 is pasted inside the body 3. In the example of FIG. 4B, since the audio resistor 41 is not exposed to the outside the body 3, a fine outer appearance can be obtained.

Figure 4C:
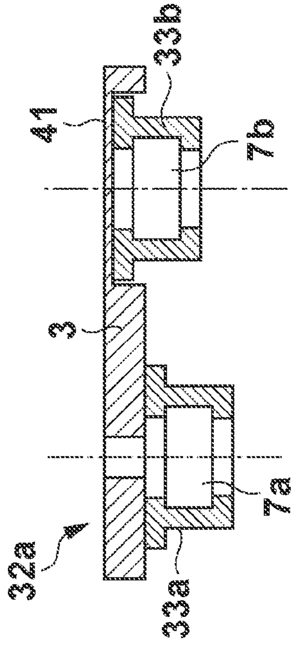

FIG. 4C shows an example in which part of the body 3 also functions as the audio resistor 41. In the example of FIG. 4C, the part of the body 3 serving as the audio resistor 41 is made so thin as to be vibrated by a sound wave. In the example of FIG. 4C, since it is unnecessary to paste the audio resistor 41 to the body 3, and the number of parts can be reduced, a fine outer appearance can be obtained. In the example of FIG. 4C, however, since the body 3 and the audio resistor 41 are integrated, the degree of freedom of design generally decreases (the strength of the body 3 may be limited by the thickness of the portion that forms the audio resistor 41, resulting in difficulty in meeting the requirements simultaneously).

Figure 4D:
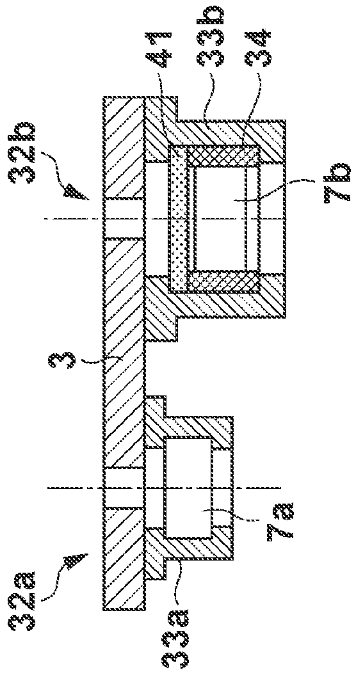

FIG. 4D shows an example in which the sufficiently rigid sleeve 34 holds the second microphone 7*b* and the audio resistor 41. The sleeve 34 preferably has a primary resonance frequency sufficiently higher than the band of the frequency to be acquired by the second microphone 7*b* (this means that the resonance frequency of the sleeve 34 is higher than f0 in FIGS. 3A and 3B). In the example of FIG. 4D, the audio resistor 41 is attached to the highly rigid sleeve 34. It is therefore possible to obtain a desired audio signal in the passband (at a frequency lower than f0 in FIGS. 3A and 3B) without being affected by the unnecessary resonance of the attachment structure.

The reverberation suppressor 53 will be described next with reference to FIGS. 1 and 5. Since the second microphone 7*b* is covered by the audio resistor 41, reverberation may occur in the closed space. In this embodiment, the reverberation suppressor 53 is provided to suppress such reverberation.

Figure 5:
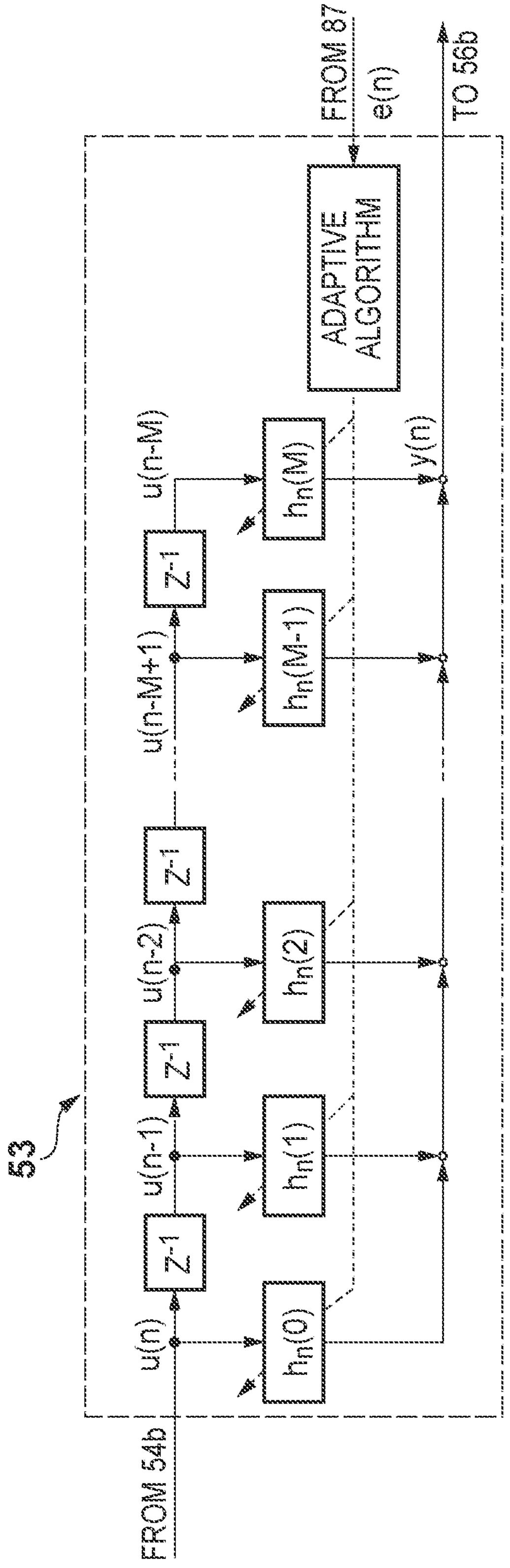
FIG. 5 is a block diagram showing the arrangement of a reverberation suppressor.

FIG. 5 shows the detailed arrangement of the reverberation suppressor 53. The reverberation suppressor 53 is formed from an adaptive filter. This adaptive filter estimates and learns the filter coefficient so as to minimize the output of the subtracter 83, Thus, the difference between the output signal of the first microphone 7*a* and the output signal of the second microphone 7*b*, which represents the level of wind noise, as will be described below in detail. The reverberation component generated in the closed space between the audio resistor 41 and the second microphone 7*b* and contained in the output signal of the second microphone 7*b* is thus suppressed. Using such an adaptive filter makes it possible to appropriately perform processing even if the reverberation generation state changes due to the change of the user's camera grip state or the change in the temperature.

The principle of reverberation suppression will briefly be described. Let s be the object sound, g1 be the object sound acquisition characteristic of the first microphone 7*a*, g2 be the object sound acquisition characteristic of the second microphone 7*b*, and r be the influence of reverberation. The object sound acquisition characteristics g1 and g2 equal the inverse Fourier transformation results of the characteristics in the frequency space shown in FIGS. 3A to 3F. A signal x1 of the first microphone 7*a* and a signal x2 of the second microphone 7*b* obtained under an environment with reverberation in the second microphone 7*b* are given by $$x1 = s * g1$$

$$x2 = s * g2 * r \tag{1}$$

where * is an operator representing convolution. As described with reference to FIGS. 3A to 3F, the first microphone 7*a* and the second microphone 7*b* can acquire similar object sounds at a frequency lower than f0. As shown in FIG. 1, the BPFs 82*a* and 82*b* extract only components in an appropriate band. Thus, the BPFs pass frequencies lower than f0 in FIGS. 3A to 3F within the audible range. The human auditory sense exhibits an extremely low sensitivity to a band of 50 Hz or less because of its characteristic. For further details, see A characteristic curve or the like. Hence, the BPFs 82*a* and 82*b* are designed to pass frequencies of, for example, 30 Hz to 1 kHz. Letting BPF be the BPFs 82*a* and 82*b*, and x1_BPF and x2_BPF be the signals that have passed through the BPFs, $$x1\_BPF = s * g1 * BPF$$

$$x2\_BPF = s * g2 * r * BPF$$

$$g1 * BPF = g2 * BPF \tag{2}$$

holds. Holding g1≠g2, and g1*BPF≠g2*BPF is equivalent to allowing the first microphone 7*a* and the second microphone 7*b* to acquire similar object sounds at a frequency lower than f0. As is apparent from equations (2), identical signals are input to the subtracter 83 in FIG. 1 when the influence r of reverberation is absent. The influence of reverberation can be reduced by operating the adaptive filter using x1_BPF=d as the desired response and x2_BPF=u as the input, as can be seen from equations (2).

When the filter of the reverberation suppressor 53 is expressed as h, an adaptive filter output y is given by $$y(n) = h * u = \sum_{i=0}^{M} h_n(i)u(n-i) = \sum_{i=0}^{M} h_n(i)\text{x2\_BPF}(n-i) \tag{3}$$

where n indicates the signal of the nth sample, M is the filter order of the reverberation suppressor 53, and the subscript of h indicates the value of a filter h of the nth sample. As the input u, x2_BPF is used.

In addition, x1_BPF=d is used as the desired response. Hence, an error signal e is expressed as $$e(n) = d(n) - y(n) = \text{x1\_BPF}(n) - \sum_{i=0}^{M} h_n(i)\text{x2\_BPF}(n-i) \tag{4}$$

Various adaptive algorithms have been proposed. For example, the update equation of h by the LMS algorithm is given by $$h_{n+1}(i) = h_n(i) + \mu e(n)u(n-i) \quad (i = 0, 1, \ldots M) \tag{5}$$

where μ is the step size parameter. According to the above-described method, an appropriate initial value h is given and updated using equation (5), thereby making u closer to d. Thus, the influence r is reduced, and x1_BPF=x2_BPF almost holds. At this time, |h*r|=1 holds in the passband of the BPF. However, in an environment where the wind noise is dominant, updating of equation (5) is not correctly performed. Hence, the estimation learning of the adaptive filter is stopped by the switch 87. The control sequence of the switch 87 will be described later together with the operation of the wind-detector 81.

As described above, the reverberation suppressor 53 suppresses reverberation. In the reverberation suppressor 53, the signal delays in accordance with the order of the adaptive filter, as is apparent from FIG. 5. To compensate for this, the audio processing apparatus in FIG. 1 includes the first delay device 55 and the second delay device 85. Typically, a delay ½ (=M/2) the filter order of the reverberation suppressor 53 is given (when M is an odd number, a neighboring value is usable). At this time, for example, h(M/2)=1 is set, and all the other values h are initialized to 0. This allows the adaptive algorithm to run using the initial value in the no reverberation state. If an appropriate initial value for reverberation suppression is stored in the memory, the operation may be started after initializing h to that value. For example, the initial value may be set in the following way. The filter coefficient can be estimated to some extent based on the design values such as the dimensions around the microphones 7*a* and 7*b* and the material of the structure. Hence, the filter coefficient obtained from the design values may be set as the initial value. Alternatively, the filter coefficient when the audio recorder has been powered off may be stored in the memory and set as the initial value when activating the audio recorder next time. Otherwise, the filter coefficient may be calculated by generating predetermined reference sound in the production process of the audio recorder and stored in the memory, and used as the initial value when activating the audio recorder.

The operation of the ALC 61 will be described next. The ALC is provided to effectively utilize the dynamic range while suppressing saturation of the audio signal. Since the audio signal exhibits a large power variation on the time base, the level needs to be appropriately controlled. The level controller 63 provided in the ALC 61 monitors the outputs from the variable gains 62*a* and 62*b*.

The attack operation will be explained first. Upon determining that the signal of higher level has exceeded a predetermined level, the gain is reduced by a predetermined step. This operation is repeated at a predetermined period. This operation is called the attack operation. The attack operation enables to prevent saturation.

The recovery operation will be described next. If the signal of higher level does not exceed a predetermined level for a predetermined time, the gain is increased by a predetermined step. This operation is repeated at a predetermined period. This operation is called the recovery operation. The recovery operation enables to obtain sound in a silent environment.

The variable gains 62*a* and 62*b* in the ALC 61 operate synchronously. Thus, when the gain of the variable gain 62*a* decreases by the attack operation, the gain of the variable gain 62*b* also decreases as much. With this operation, the level difference between the signal channels is eliminated, and the sense of incongruity decreases when the signals of the channels are mixed by the mixer 71.

The wind-detector 81 will be described next. Let w1 be wind noise picked up by the first microphone 7*a*, and w2 be wind noise picked up by the second microphone 7*b*. The BPFs 82*a* and 82*b* do not mask the wind noise because the power of wind noise concentrates to the lower frequency range, as described above with reference to FIGS. 3A to 3F. Thus, (w1−w2) representing the level difference between the output signal of the first microphone 7*a* and the output signal of the second microphone 7*b* is obtained as the output of the subtracter 83. Note that the above-described influence of reverberation is assumed to be negligible. In an actual environment as well, the influence of reverberation is negligible because it is much smaller than the wind noise.

The level detector 86 performs absolute value calculation of the output of the subtracter 83 and then appropriately performs LPF processing. The cutoff frequency of the LPF is determined based on the stability and detection speed of the wind-detector, and about 0.5 Hz suffices. The LPF operates to integrate a signal in the masking range and directly pass a signal in the passband. As a result, the same effect as that of integration operation+HPF can be obtained. Thus, the output becomes large when the absolute value calculation maintains high level for a predetermined time (the time changes depending on the above-described cutoff frequency). Thus, this is equivalent to monitoring $\Sigma|w1-w2|$ for an appropriate time.

Figure 6A:
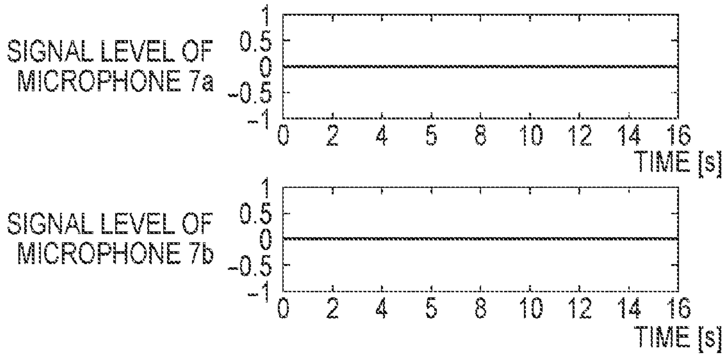
FIGS. 6A to 6D are timing charts showing the operation of a wind-detector according to wind noise.
Figure 6B:
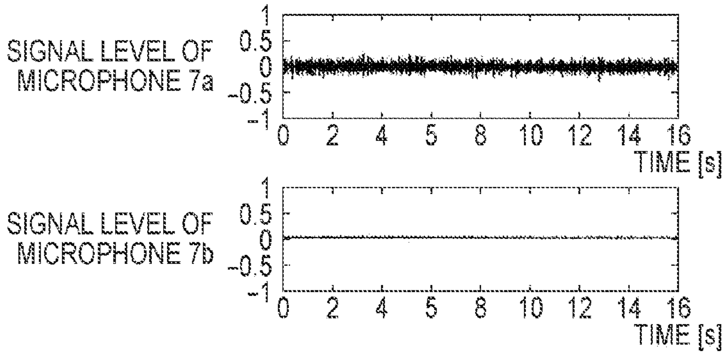
Figure 6C:
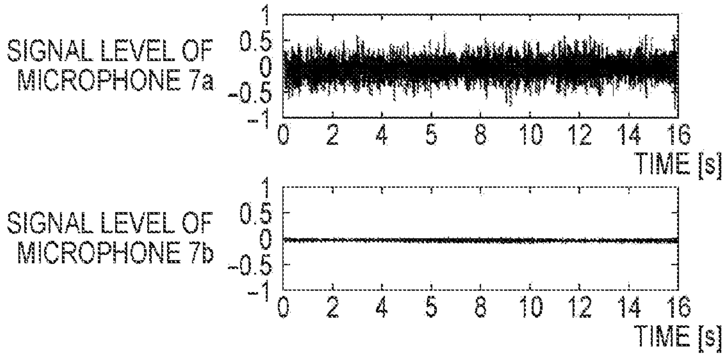

FIGS. 6A to 6D show examples of the output signal of the wind-detector 81 which changes depending on the wind strength. FIGS. 6A, 6B, and 6C are views showing signals obtained by the first microphone 7*a* and the second microphone 7*b*. The abscissa represents time, and the ordinate represents the signal level. Referring to FIGS. 6A, 6B, and 6C, the signal level +1 indicates the level at which a signal in the positive direction is saturated. FIG. 6A shows the signal in the windless state, FIG. 6B shows the signal when the wind is weak, and FIG. 6C shows the signal when the wind is strong. As is apparent, as the wind strength increases, the signal level of the first microphone 7*a* rises, and wind noise is generated. On the other hand, the signal level of the second microphone 7*b* does not so largely increase as compared to that of the first microphone 7*a*, as can be seen. This indicates that the wind noise is reduced by the effect of the audio resistor 41.

Figure 6D:
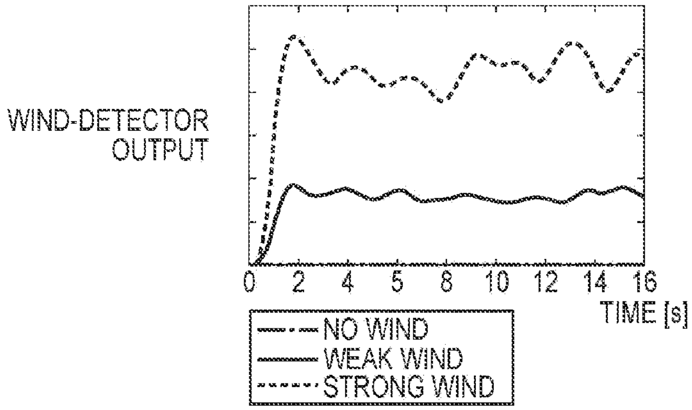

FIG. 6D shows a result obtained by the above-described processing of the wind-detector 81. In FIG. 6D, the abscissa represents time, like FIGS. 6A, 6B, and 6C, and the ordinate represents the output of the wind-detector. Note that the passband of the BPFs 82*a* and 82*b* is 30 Hz to 1 kHz, and the cutoff frequency of the LPF in the level detector 86 is 0.5 Hz. As is apparent, the output of the wind-detector 81 remains almost zero in the windless state and increases its value as the wind becomes stronger. In FIG. 6D, the signal near 0 sec is small because rising delays due to the influence of the LPF in the level detector 86. Until wind detection, a delay as illustrated occurs in the leading edge of the signal in FIG. 6D. When the delay is made smaller, the wind-detector is readily affected by fluctuations of wind. In this embodiment, wind detection is done with a delay as shown in FIG. 6D.

The output of the wind-detector 81 is used for the switch 87 of the above-described reverberation suppressor 53 and also used to switch the HPF 52 to be described later and switch the mixing processing in the mixer 71.

The operation of the mixer 71 will be described next with reference to FIGS. 7A to 7D. Changing the variable gain 74 and the cutoff frequency of the HPF 73 based on the output of the wind-detector 81 has been described with reference to FIG. 1. A detailed changing method will be described with reference to FIGS. 7A to 7D.

Figure 7A:
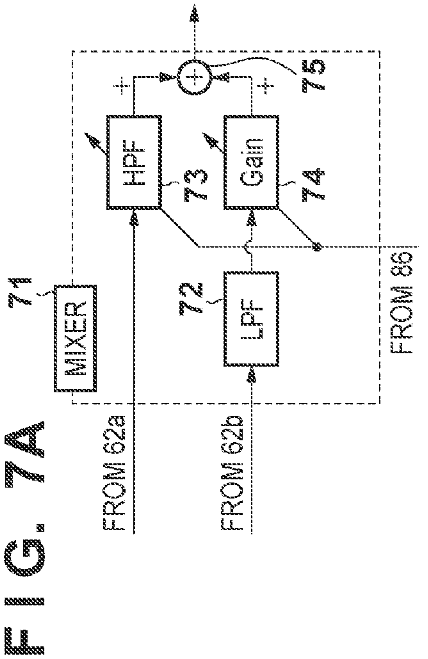
FIGS. 7A to 7D are views showing the arrangements and operations of a mixer.
Figure 7B:
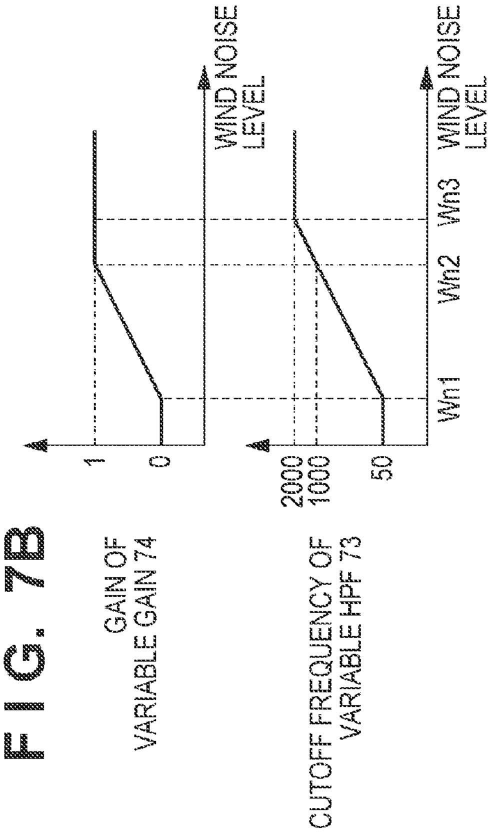
Figure 7C:
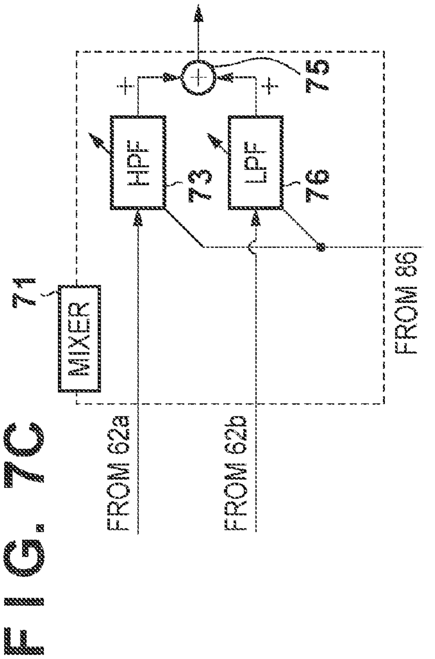
Figure 7D:
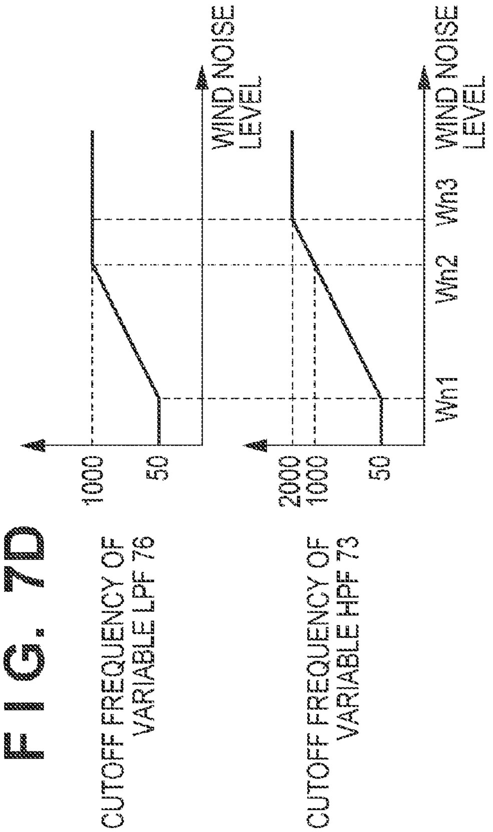

FIGS. 7A and 7C show examples of the arrangement of the mixer 71. FIGS. 7B and 7D are graphs showing methods of changing the variable parts in FIGS. 7A and 7C, respectively.

The arrangement shown in FIG. 7A will be described. The mixer 71 shown in FIG. 7A has the same arrangement as that in FIG. 1. Referring to FIG. 7A, the cutoff frequency (first cutoff frequency) of the HPF 73 is variable, whereas the cutoff frequency (second cutoff frequency) of the LPF 72 is fixed to, for example, 1 kHz. The upper graph of FIG. 7B schematically represents the gain of the variable gain 74, and the lower graph schematically represents the cutoff frequency of the HPF 73. The abscissa of FIG. 7B is common to the two graphs. Wn1, Wn2, and Wn3 are thresholds representing the level of wind noise and indicate that the wind noise becomes stronger in this order.

As shown in FIG. 7B, when the wind noise is smaller than the first threshold Wn1, wind processing is unnecessary. Hence, the gain of the variable gain 74 is set to the first lower limit value (for example, 0), and the cutoff frequency of the HPF 73 is set to the second lower limit value (for example, 50 Hz). As a result, the signal from the second microphone 7*b* is completely masked via the circuit shown in FIG. 7A, and the signal in the audible range (where frequencies higher than the cutoff frequency of the HPF 73, that is, 50 Hz, are the dominant components of sound) can be obtained only from the first microphone 7*a*. Since the signal of the second microphone 7*b* provided with the audio resistor 41 need not be used, the object sound is supposedly obtained faithfully.

A case will be described in which the wind noise level falls within the range from the first threshold Wn1 (inclusive) to the second threshold Wn2 (exclusive). Within this range, as the wind noise level rises, the variable gain 74 is increased, and the cutoff frequency of the HPF 73 is raised. This control is performed to gradually increase, in the low-frequency audio signal, the ratio of the signal from the second microphone 7*b* provided with the audio resistor 41. The wind noise largely acts on the signal from the first microphone 7*a*. However, the wind noise is reduced by raising the cutoff frequency of the HPF 73.

A case will be described in which the wind noise level falls within the range from the second threshold Wn2 (inclusive) to the third threshold Wn3 (exclusive). At this time, the value of the variable gain 74 is fixed to a predetermined upper limit value (for example, 1), and the cutoff frequency of the HPF 73 is raised as the wind noise level rises. Performing this control allows to further reduce the wind noise, although the audio that exists from the cutoff frequency of the LPF 72 to the cutoff frequency of the HPF 73 is lost. The cutoff frequency of the HPF 73 is not raised beyond an appropriate value because if it excessively rises, the object sound degrades too much. In the example of FIG. 7B, when the wind noise level is equal to or more than the third threshold Wn3, the cutoff frequency of the HPF 73 is fixed to 2 kHz and does not change any more.

The arrangement shown in FIG. 7C that is another example will be described. The mixer 71 shown in FIG. 7C includes a variable LPF 76 in place of the fixed LPF 72 and the variable gain 74. The upper graph of FIG. 7D schematically represents the cutoff frequency of the variable LPF 76, and the lower graph schematically represents the cutoff frequency of the HPF 73. The abscissa of FIG. 7D is common to the two graphs. Wn1, Wn2, and Wn3 are thresholds representing the level of wind noise and indicate that the wind noise becomes stronger in this order.

As shown in FIG. 7D, when the wind noise level is smaller than the first threshold Wn1, wind processing is unnecessary. Hence, the cutoff frequencies of the variable LPF 76 and the HPF 73 are set to 50 Hz. As a result, the signal from the second microphone 7*b* is almost completely masked via the circuit shown in FIG. 7C, and the signal in the audible range (where frequencies higher than the cutoff frequency of the HPF 73, that is, 50 Hz, are the dominant components of sound) can be obtained only from the first microphone 7*a*. Since the signal of the second microphone 7*b* provided with the audio resistor 41 need not be used, the object sound is supposedly obtained faithfully.

A case will be described in which the wind noise level falls within the range from the first threshold Wn1 (inclusive) to the second threshold Wn2 (exclusive). Within this range, as the wind noise level rises, the cutoff frequencies of the variable LPF 76 and the HPF 73 rise while, for example, remaining identical. This control is performed to gradually use the signal from the second microphone 7*b* provided with the audio resistor 41 as the low-frequency audio signal. The wind noise largely acts on the signal from the first microphone 7*a*. However, the wind noise is reduced by raising the cutoff frequency of the HPF 73.

A case will be described in which the wind noise level falls within the range from the second threshold Wn2 (inclusive) to the third threshold Wn3 (exclusive). At this time, the cutoff frequency of the variable LPF 76 is fixed to a predetermined value (for example, 1 kHz), whereas the cutoff frequency of the HPF 73 is raised as the wind noise level rises. This control is performed to further reduce the wind noise, although the audio that exists from the cutoff frequency of the variable LPF 76 to the cutoff frequency of the HPF 73 is lost. The cutoff frequency of the HPF 73 is not raised beyond an appropriate value because if it excessively rises, the object sound degrades too much. In the example of FIG. 7D, when the wind noise level is equal to or more than the third threshold Wn3, the cutoff frequency of the HPF 73 is fixed to 2 kHz and does not change any more.

An example has been described above in which the HPF 73 is operated in a range wider than that of the operations of the variable gain 74 and the variable LPF 76. The HPF 73 may be operated only in the same range as that of the operations of the variable gain 74 and the variable LPF 76 by setting Wn2=Wn3 obviously. When the operation is limited, the object sound can faithfully be acquired, although the wind noise reduction effect becomes small. On the other hand, the level of the wind noise generated in the first microphone 7*a* when the wind blows largely changes depending on the attachment structure of the microphone or the like. Settings of Wn1, Wn2, and Wn3 are adjusted by comparing, for example, the necessity of wind noise reduction with the necessity of faithfully acquiring an object sound.

The range where the cutoff frequency of the variable LPF or LPF changes in the example of the mixer 71 shown in FIGS. 7A to 7D has been described above in detail. Examples of the cutoff frequency changeable range and the filter arrangement will briefly be described.

The mixer 71 of this embodiment mixes audios acquired by the plurality of microphones 7*a* and 7*b*. In the processing of mixing signals of separated bands, particularly, the signals of the plurality of microphones preferably have the same phase on the respective paths in the overlapping frequency band. If the phases are shifted by the processing in the plurality of paths, the waveforms may cancel each other because they do not accurately match. To sufficiently meet this requirement, the HPF 73 and the LPF 72 are preferably formed from FIR filters of the same order. Using the FIR filters makes it possible to consistently mix the signals even when a so-called group delay properly is obtained, and processing is performed for each band. If the cutoff frequency of the FIR filter is very low (exactly speaking, if the ratio is very low when standardizing by the ratio to the sampling frequency), a filter of a very high order is necessary for obtaining sufficient filter performance. This is derived from the fact that a number of samples are required to obtain the wave of the frequency of the masking/passing target. Since the order of the filter cannot be increased infinitely, the lower limit of the cutoff frequency changeable range is determined. In the arrangement shown in FIG. 7C, the LFP and the HPF are variable. Hence, the order of the variable LPF 76 and the HPF 73 becomes very high if the cutoff frequency is very low. Thus, in the examples shown in FIGS. 7A to 7D, the lower limit of the frequency is set to 50 Hz not to largely affect the signal in the audible range. As described above, the frequency is not limited to 50 Hz and can appropriately be set in accordance with the computational resource. In the example shown in FIG. 7A, only the HPF is variable. Hence, only one filter of high order as described above suffices. This arrangement has an advantage over that in FIG. 7C in terms of calculation amount reduction.

On the other hand, the upper limit of the changeable range is determined by the second microphone 7*b* provided with the audio resistor 41. As schematically shown in FIG. 3B, the band of the object the second microphone 7*b* can acquire is limited to f0 by the influence of the audio resistor 41. Beyond this, no object sound is obtained. Hence, in the examples shown in FIGS. 7A to 7D, the cutoff frequencies of the variable LPF 76 and the HPF 73 should be set lower. In FIGS. 3A to 3F, the frequency is f1, and it should obviously satisfy f1<f0.

The effect and variable operation of the HPF 52 will be described with reference to FIGS. 1, 3A to 3F, 6A to 6D, and 8A to 8D to 11A and 11B. As described above with reference to FIGS. 3A to 3F and 6A to 6D, the wind noise concentrates to the lower frequency range and affects the first microphone 7*a* and the second microphone 7*b* in much different ways. Thus, even weak wind generates large wind noise in the first microphone 7*a*. Problems caused by this are saturation of the ADC 54*a* and an inappropriate operation of the ALC 61. Saturation of the ADC 54*a* is easily understandable, and a description thereof will be omitted. The problem of the operation of the ALC 61 at the time of wind noise generation will be explained.

If the HPF 52 does not exist, large wind noise is generated in the first microphone 7*a*, as shown in FIGS. 6A to 6D. Even if the wind noise and the object sound are superposed, the wind noise is assumed to be dominant. In such an environment, the ALC 61 performs level control by referring to the wind noise level of the first microphone 7*a*. When the HPF 73 in the mixer 71 then processes the wind noise, the level of the audio signal greatly lowers. As a result, the output of the adder 75 is very small. Thus, the signal level is inappropriate.

To solve the above-described problems such as the saturation of the ADC and the inappropriate signal level, for example, the technique of patent literature 1 may be applied. However, according to the related art, the circuit scale becomes large because the ALC operation is performed at two portions, and the quantization error may also increase.

Consider the HPF 52 shown in FIG. 1, which is the second high-pass filter for suppressing wind noise. When the cutoff frequency (third cutoff frequency) of the HPF 52 is appropriately set, the main components of wind noise can be removed.

This enables to prevent saturation of the ADC 54*a* and allows the ALC 61 to appropriately control the gain (since the object sound is not buried in wind noise at the point of the ALC 61, an ALC operation corresponding to the level of the object sound can be performed).

Figure 8A:
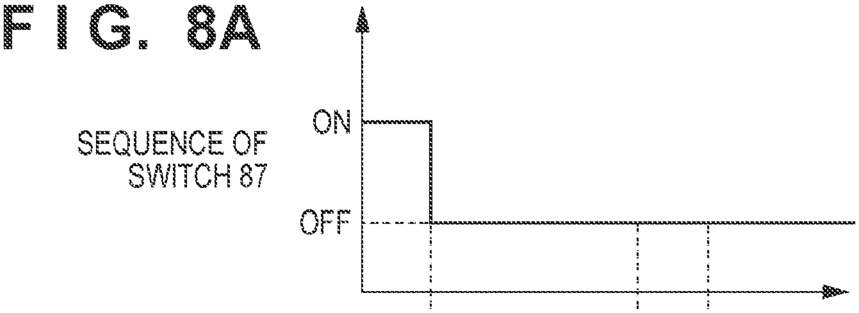
FIGS. 8A to 8D are graphs showing the operation sequences of a switch, variable filters, ad a variable gain.
Figure 8B:
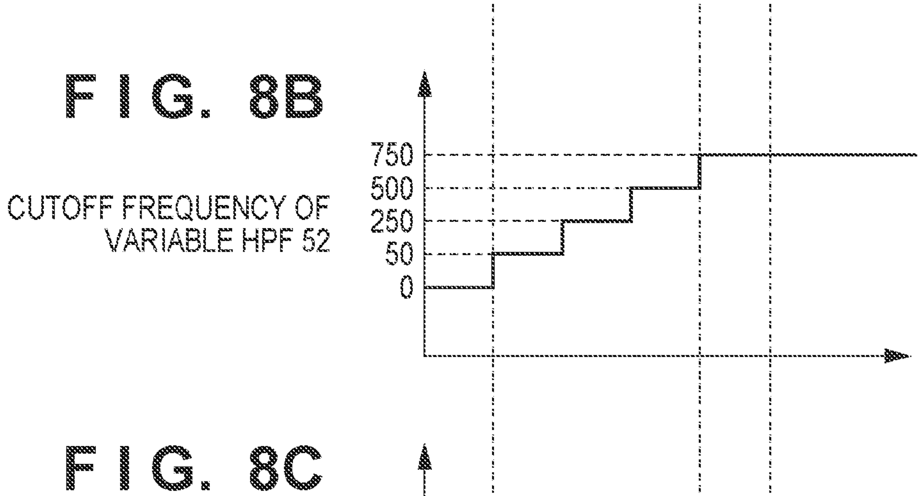
Figure 8C:
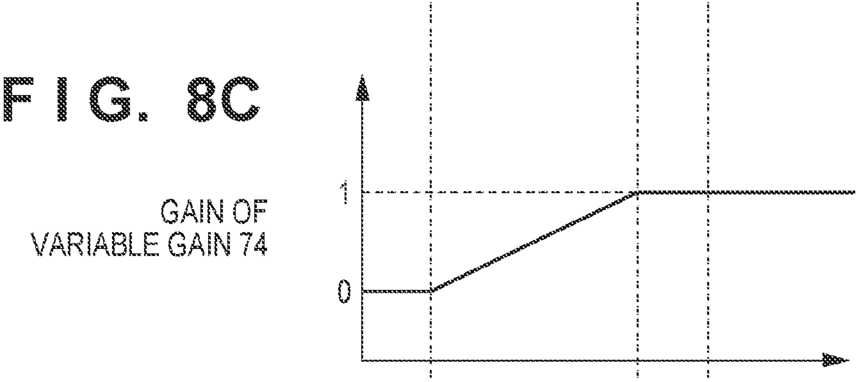
Figure 8D:
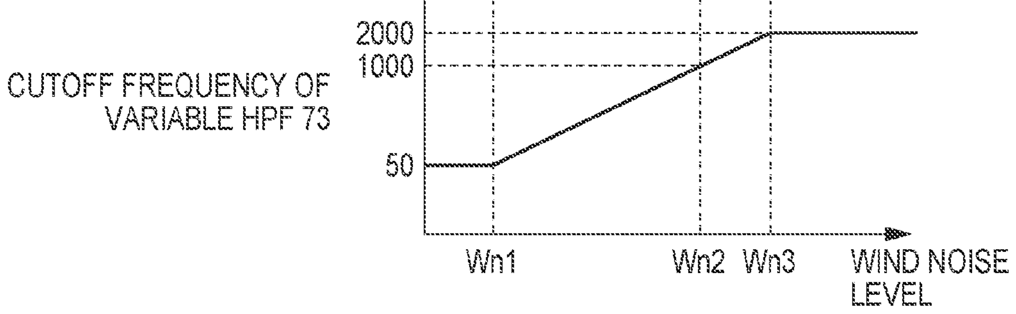

An example of the cutoff frequency control sequence of the HPF 52 will be described with reference to FIGS. 8A to 8D. FIG. 8A shows the operation sequence of the switch 87. FIG. 8B shows the operation sequence of the HPF 52. FIG. 8C shows the operation sequence of the variable gain 74. FIG. 8D shows the operation sequence of the HPF 73 that is the first high-pass filter for passing only the high-frequency components of the output signal of the ALC 61. The abscissa representing the level of wind noise is common to FIGS. 8A to 8D. Wn1, Wn2, and Wn3 are thresholds representing the level of wind noise and indicate that the wind noise becomes stronger in this order. The operation in FIGS. 8C and 8D is the same as that in FIG. 7B, and a description thereof will not be repeated.

When the wind noise level is smaller than the first threshold Wn1, wind processing is unnecessary. Hence, the switch 87 is turned on, and the adaptive operation of the reverberation suppressor 53 described above is performed. The cutoff frequency of the HPF 52 is set to 0 Hz (=through without the HPF operation). Since the signal of the second microphone 7*b* provided with the audio resistor 41 need not be used, the object sound is supposedly obtained faithfully.

When the wind noise level is equal to or more than the first threshold Wn1, wind noise is generated. Hence, the switch 87 is turned off, and the adaptive operation of the reverberation suppressor 53 described above is stopped. This control allows to suppress the inappropriate adaptive operation.

A case will be described in which the wind noise level falls within the range from the first threshold Wn1 (inclusive) to the second threshold Wn2 (exclusive). At this time, as the wind noise level rises, the cutoff frequency of the HPF 52 rises stepwise at a value lower than the cutoff frequency of the HPF 73. Performing this control enables to reduce the wind noise generated in the first microphone 7*a*. When the control is performed not to exceed the cutoff frequency of the HPF 73, the cutoff frequency of the HPF 52 does not largely affect the output of the HPF 73.

Effects obtained by this arrangement will be described. The HPF 52 is provided in the analog part (before the ADC) of the audio processing apparatus 51 and therefore formed from an IIR filter (an HPF formed from an RC circuit) in general. At this time, the HPF 52 cannot satisfy the group delay property. On the other hand, the phase delay is small in the passband even in the IIR filter. Thus, even if the group delay property is not satisfied, the phase delay does not affect. Controlling the cutoff frequencies of the HPFs 52 and 73 as described above makes it possible to reduce the influence of the phase delay caused by the IIR filter. As described above, in the processing of mixing signals of separated bands, particularly, the signals of the plurality of microphones preferably have the same phase on the respective paths in the overlapping frequency band. However, even if this condition is not satisfied, the influence can be reduced. In addition, the HPF 52 is provided in the analog part of the audio processing apparatus 51. However, if the HPF 52 is configured to continuously change the cutoff frequency in the analog circuit, the circuit scale becomes large. When a circuit suitable for the control sequence described with reference to FIGS. 8A to 8D is formed, the HPF can be implemented by a simple arrangement.

Figure 9:
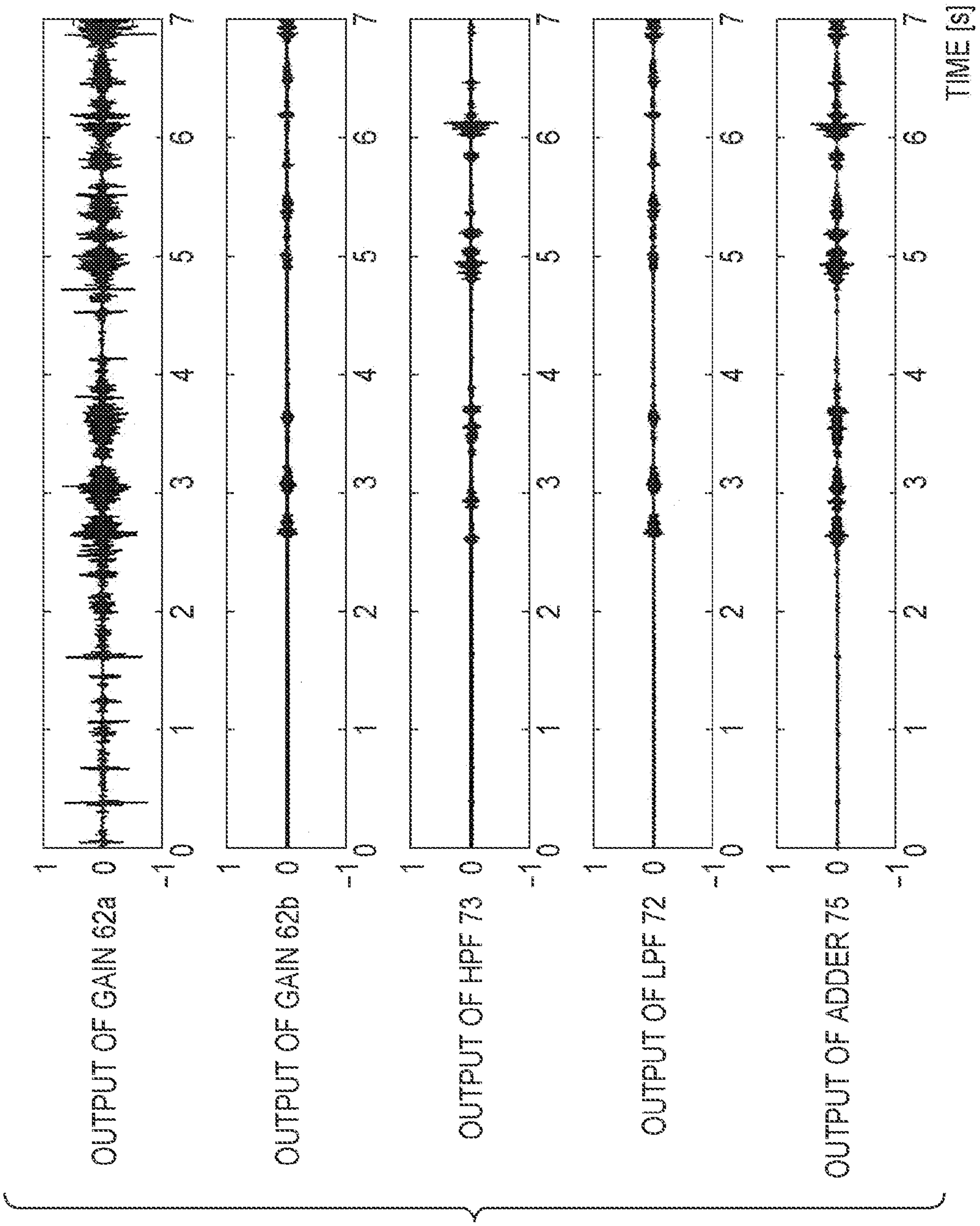
FIG. 9 is a timing chart for explaining wind noise processing when no HPF exists.
Figure 10:
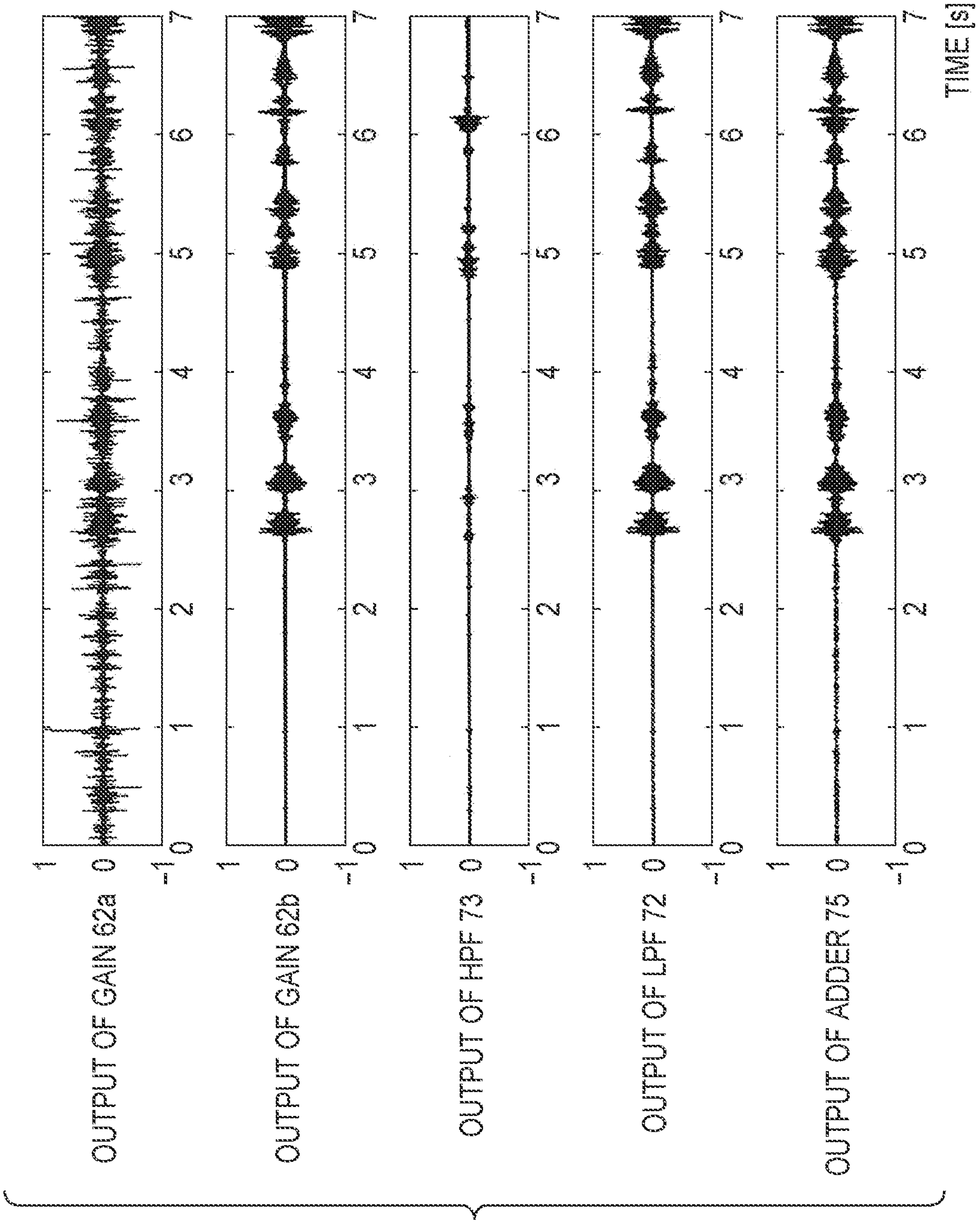
FIG. 10 is a timing chart for explaining wind noise processing when an HPF exists.

FIGS. 9 and 10 show examples of signals processed by the above-described circuit. FIG. 9 shows a case in which the HPF 52 is not provided. FIG. 10 shows a case in which the HPF 52 is provided. The signals in FIG. 9 are processed in a state in which the HPF 52 is removed from the arrangement in FIG. 1. As illustrated, the graphs represent the output of the gain 62*a*, the output of the gain 62*b*, the output of the HPF 73, the output of the LPF 72, and the output of the adder 75, respectively, sequentially from the upper side. The abscissa represents time and is common to all graphs. The examples shown in FIGS. 9 and 10 indicate that the object speaks from near 2.5 sec (human voice is the sound to be collected). The signals shown in FIGS. 9 and 10 are processed assuming that the wind noise level is Wn2 in FIGS. 8A to 8D.

Only wind noise exists before 2.5 sec, as in the graphs of FIGS. 6A to 6D. Placing focus only on this portion, the output of the gain 62*a* appears to be larger in FIG. 10 than in FIG. 9. This is because the gain is actually increased by the ALC 61. This is apparent from the portion after 2.5 sec where the output is superposed on the object sound.

Placing focus on the output of the gain 62*b* after 2.5 sec reveals that the signal in FIG. 9 obviously has a signal level lower than that of the signal in FIG. 10. This is because the gain becomes smaller because of the level control performed by the ALC 61 for the wind noise generated in the first microphone 7*a*, and the object sound is consequently acquired very small. On the other hand, in the signal shown in FIG. 10, the wind noise generated in the first microphone 7*a* is reduced by the effect of the HPF 52, and the gain of the ALC 61 is kept high as compared to the state of FIG. 9.

Placing focus on the output of the HPF 73 in FIG. 9 reveals that the wind noise is considerably reduced by appropriately processing the cutoff frequency of the HPF 73. However, since the signal level of the output of the HPF 73 is much lower than that of the output of the gain 62*a*, the signal level of the final output from the adder 75 is very low, as can be seen.

On the other hand, even in FIG. 10, the wind noise is considerably reduced by appropriately processing the cutoff frequency of the HPF 73, as is apparent. In addition, since the output of the LPF 72 remains large, the signal level of the final output from the adder 75 is also kept at a sufficient level, as can be seen.

As described above, when the HPF 52 is arranged on a side closer to the microphone than the ADC and the ALC, a high-quality audio can be obtained.

Figure 11A:
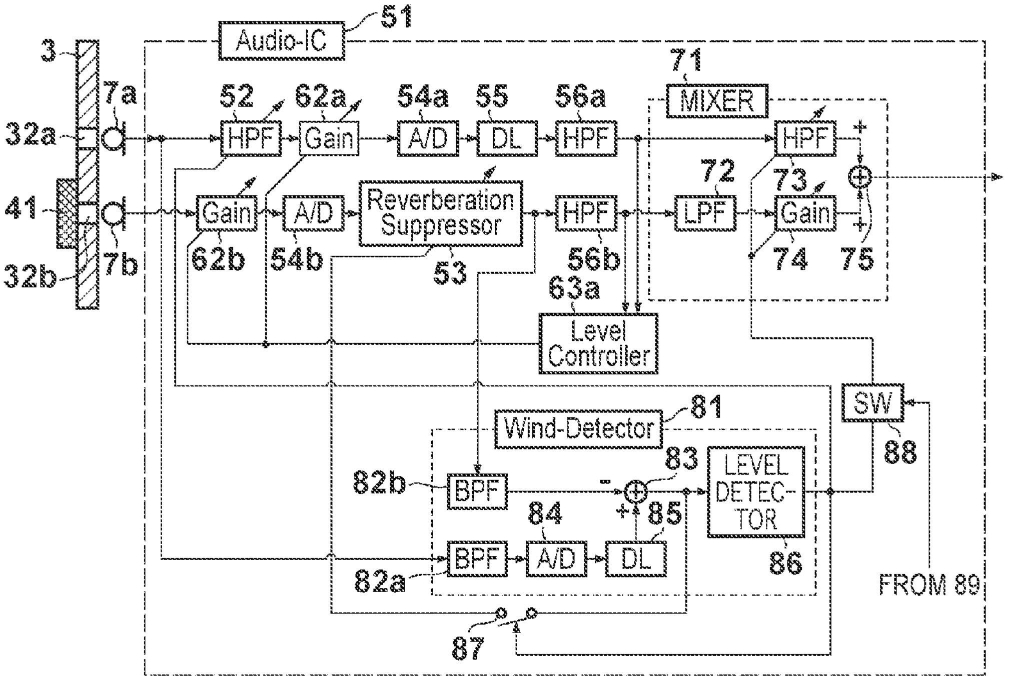
FIGS. 11A and 11B are block diagrams showing other examples of the audio processing apparatus.
Figure 11B:
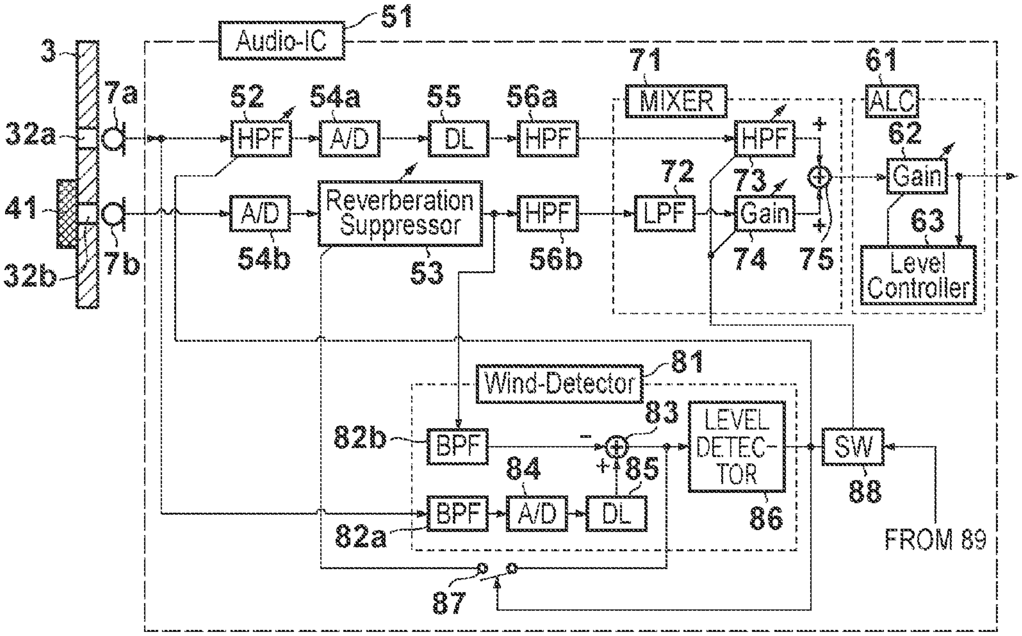

FIGS. 11A and 11B illustrate other examples of the circuit arrangement of this embodiment. FIG. 11A shows an example in which the ALC is arranged in the analog part. FIG. 11B shows an example in which the ALC 61 is arranged after the mixer 71. Even such an arrangement enables to obtain the effects described in this embodiment.

As described above, according to this embodiment, it is possible to obtain a high-quality audio with suppressed wind noise by a simple circuit arrangement.

Second Embodiment

An audio recorder and an image capture device including the audio recorder according to the second embodiment of the present invention will be described below with reference to FIGS. 12 and 13. The same reference numerals as in the first embodiment denote parts that perform the same operations in the second embodiment.

Figure 12:
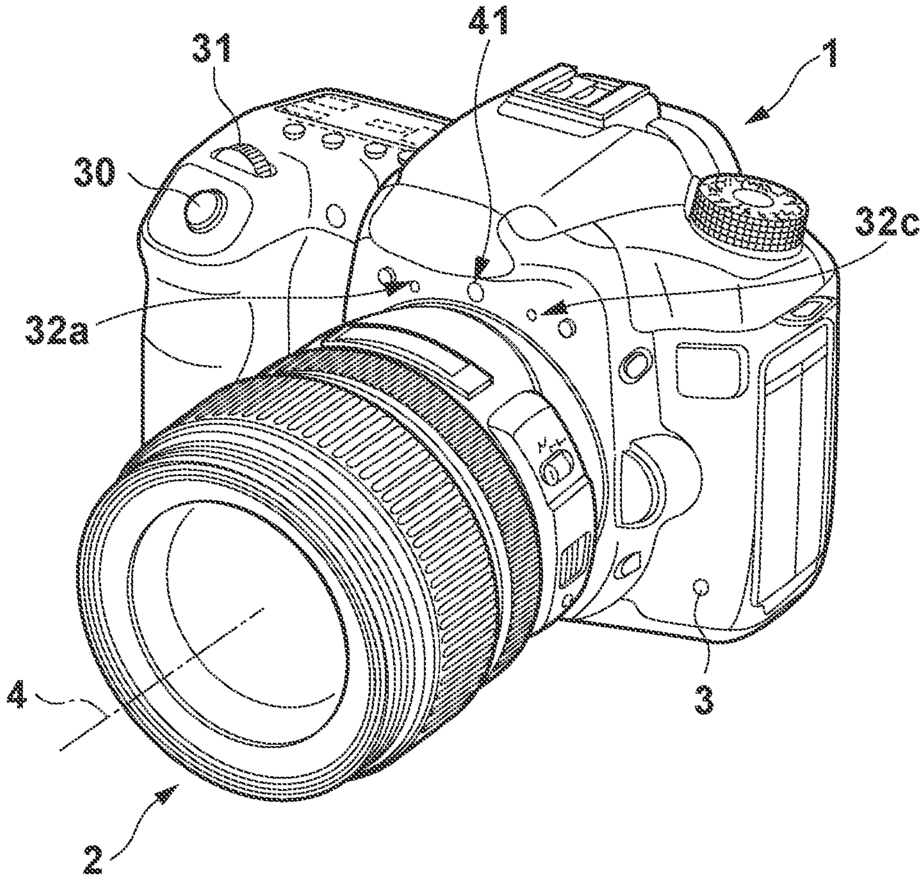
FIG. 12 is a perspective view showing an image capture device according to the second embodiment.

FIG. 12 is a perspective view showing the image capture device. Although the apparatus in FIG. 12 is similar to that of FIG. 2A, an opening portion 32*c* for a microphone is added. A microphone 7*c* (not shown) is provided behind the opening portion 32*c*.

Figure 13:
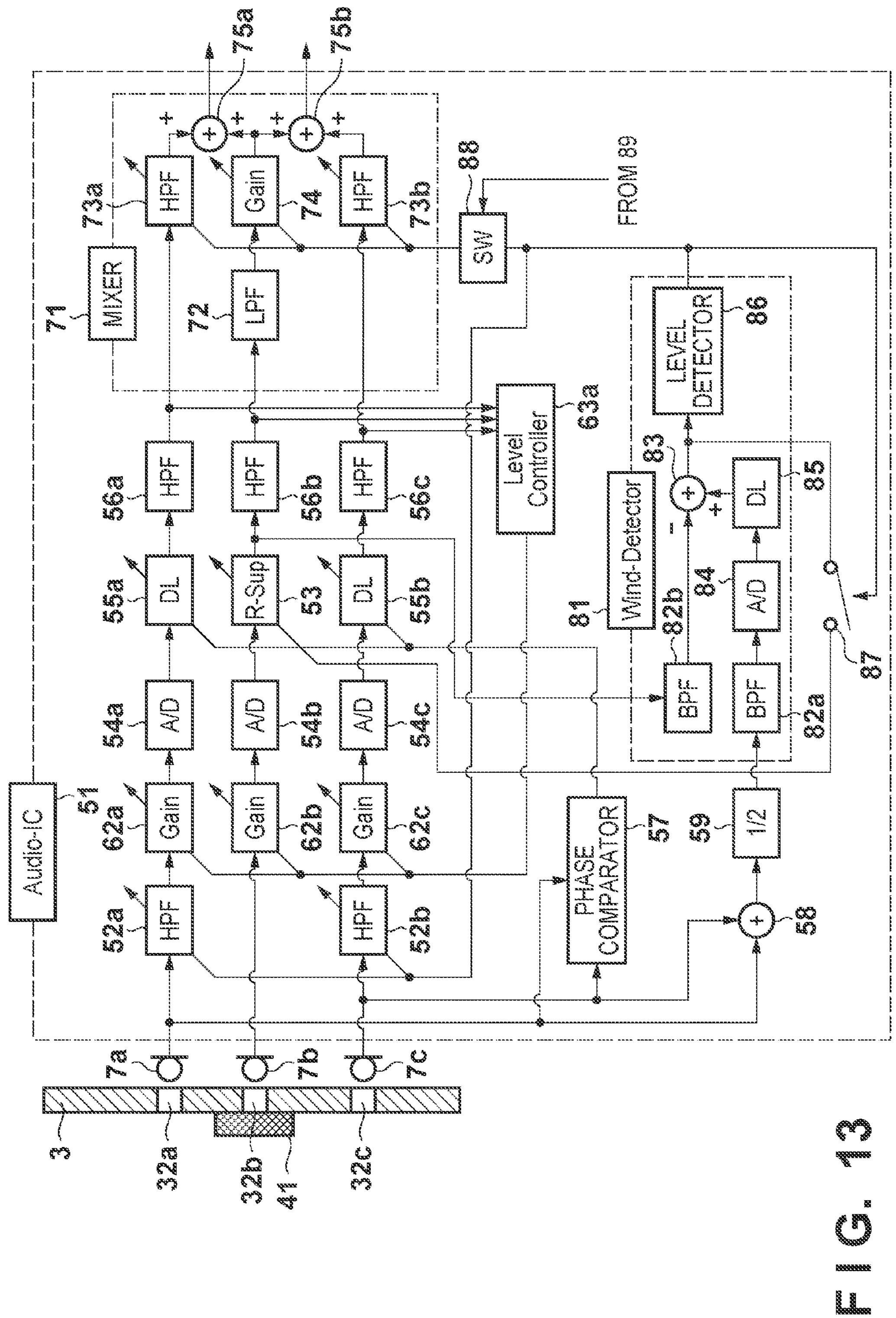
FIG. 13 is a block diagram showing the arrangement of an audio processing apparatus according to the second embodiment.

FIG. 13 is a block diagram for explaining the main part of an audio processing apparatus 51 corresponding to the apparatus shown in FIG. 12. In FIG. 13, the arrangement is extended to a stereo system based on the circuit including the ALC in the analog part according to the first embodiment shown in FIG. 11A. The illustrations of a reverberation suppressor 53 and a level detector 86 are simplified/changed. A first microphone 7*a* is extended to two microphones, unlike the first embodiment. The microphones 7*a* and 7*c* respectively constitute the left and right channels of the stereo system and are designed to have the same characteristic. On the other hand, a second microphone 7*b* is provided with an audio resistor 41 and has the same characteristic as in the first embodiment.

An HPF 52*b*, a gain 62*c*, an ADC 54*c*, a DC component cutting HPF 56*c*, and an HPF 73*b* extended in FIG. 13 perform the same operations as those of the HPF 52, the gain 62*a*, the ADC 54*a*, the DC component cutting HPF 56*a*, and the HPF 73 described in the first embodiment, respectively. Delay devices 55*a* and 55*b*, a newly provided phase comparator 57, an adder 58, and a gain 59 whose operations change will be described here.

In the stereo audio recorder, the signal are given the stereo effect by the phase difference between the audio signals. In the arrangement shown in FIG. 12, the second microphone 7*b* is arranged between the first microphones 7*a* and 7*c*. In this arrangement, when the phase difference between the microphones 7*a* and 7*c* is considered, the phase of the signal of the second microphone 7*b* exists between them. For example, when the second microphone 7*b* is arranged just at the intermediate point equidistant from the microphones 7*a* and 7*c*, the phase also exists at the intermediate point. In the circuit shown in FIG. 13, the phase difference between the microphones 7*a* and 7*c* is calculated, and a delay corresponding to it is given by the delay devices 55*a* and 55*b*.

For example, examine a case in which the signal of the microphone 7*c* delays from that of the microphone 7*a*. At this time, the reverberation suppressor is controlled to comply with the intermediate signal, as will be described later. When mixing with the signal of the microphone 7*a*, the phase is advanced. When mixing with the signal of the microphone 7*c*, the phase is delayed to mix the signals. In the first embodiment, a delay ½ (=M/2) the filter order of the reverberation suppressor 53 is given. The delay device 55*a* gives a smaller delay, and the delay device 55*b* gives a larger delay. The absolute value changes depending on the position of the microphone. For example, when the second microphone 7*b* is located at the intermediate point between the first microphones 7*a* and 7*c*, as described above, each phase is shifted by ½ the phase difference calculated by the phase comparator 57. Performing the above-described processing allows to obtain an audio signal without reducing the stereo effect.

The adder 58 and the gain 59 will be explained. The adder 58 adds the signals of the microphones 7*a* and 7*c*. The gain 59 halves the output of the adder 58. As a result, the output of the gain 59 is the average of the microphones 7*a* and 7*c*. A thus obtained audio signal has the intermediate phase between the signals of the microphones 7*a* and 7*c*. On the other hand, a BPF 82*a* passes only a band of about 30 Hz to 1 kHz, as described above in the first embodiment. The audio processing apparatus 51 is configured to acquire even an audio signal of a frequency higher than the passband of the BPF. As for the audio signal acquirable at this time, the microphones 7*a* and 7*c* are arranged such that no phase inversion occurs between their signals. When observing only in the passband of the BPF 82*a*, the phase difference between the signals of the microphones 7*a* and 7*c* is small. Hence, the levels of the signals in the passband of the BPF 82*a* can be considered to be almost added. Thus, when the gain 59 halves the output, a signal having a signal level almost equal to that of the first microphones 7*a* and 7*c* and a phase at the intermediate point can be obtained. In this embodiment, the reverberation suppressor 53 is operated so as to comply with the output of the gain 59 described above.

With the above-described arrangement, the present invention is easily applicable even to a stereo audio recorder without reducing the stereo effect.

In this embodiment, a stereo apparatus (including two first microphones for acquiring a high-frequency range) has been described. The arrangement can easily be extended to an audio recorder including more microphones.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-027843 Feb. 10, 2011, which is hereby incorporated by reference herein in its entirety.

What is claimed is:

1. An audio processing apparatus comprising:

a first audio pickup unit;

a second audio pickup unit including an audio resistor provided to cover a sound receiving portion to suppress external wind introduction while passing an external audio;

a first A/D converter that digitizes an output signal from said first audio pickup unit;

a second A/D converter that digitizes an output signal from said second audio pickup unit;

a level controller that controls at least one of a signal level of an output signal of said first A/D converter and a signal level of an output signal of said second A/D converter;

a first filter that attenuates a signal having a frequency lower than a first cutoff frequency of the output signal of said first A/D converter;

a third filter that attenuates a signal having a frequency higher than a second cutoff frequency of the output signal of said second A/D converter;

an adder that adds an output signal of said first filter and an output signal of said third filter to output an audio with reduced wind noise; and a second filter provided between said first audio pickup unit and said first A/D converter to attenuate a signal having a frequency lower than a third cutoff frequency for suppressing the wind noise, wherein the audio resistor suppresses the wind noise and acts as a structural low-pass filter for an audio other than the wind noise, and the first cutoff frequency is lower than a cutoff frequency of the structural low-pass filter.

2. The apparatus according to claim 1, wherein the third cutoff frequency is lower than the first cutoff frequency.

3. The apparatus according to claim 1, wherein said first filter can change the first cutoff frequency, and the apparatus further comprises:

a detector that detects a level of the wind noise based on a level difference between the output signal of said first audio pickup unit and the output signal of said second audio pickup unit;

an amplifier provided between said third filter and said adder to amplify the output signal of said third filter; and a control unit that controls the cutoff frequency of said first filter, the cutoff frequency of said second filter, and an amplification factor of said amplifier based on the level of the wind noise detected by said detector.

4. The apparatus according to claim 3, wherein when the level of the wind noise detected by said detector falls within a predetermined range, said control unit increases the amplification factor and raises the first cutoff frequency of the first filter as the level of the wind noise rises.

5. The apparatus according to claim 4, wherein said second filter is configured to change the cutoff frequency, and when the level of the wind noise detected by said detector falls within the predetermined range, said control unit further raises the third cutoff frequency of said second filter stepwise at a value lower than the first cutoff frequency of said first filter as the level of the wind noise rises.

6. The apparatus according to claim 1, wherein said first filter and said third filter are configured to change the cutoff frequencies, and the apparatus further comprises:

a detector that detects a level of the wind noise based on a level difference between the output signal of said first audio pickup unit and the output signal of said second audio pickup unit; and a control unit that controls the first cutoff frequency of said first filter and the second cutoff frequency of said third filter based on the level of the wind noise detected by said detector.

7. The apparatus according to claim 6, wherein when the level of the wind noise detected by said detector falls within a predetermined range, said control unit raises the first cutoff frequency of the first filter and the second cutoff frequency of said third filter as the level of the wind noise rises.

8. The apparatus according to claim 7, wherein said second filter is configured to change the cutoff frequency, and when the level of the wind noise detected by said detector falls within the predetermined range, said control unit further raises the third cutoff frequency of said second filter stepwise at a value lower than the first cutoff frequency of said first filter as the level of the wind noise rises.

9. The apparatus according to claim 1, further comprising a reverberation suppressor that suppresses a reverberation component generated in a closed space between the audio resistor and said second audio pickup unit and contained in the output signal of said second audio pickup unit by estimating and learning a filter coefficient so as to minimize the difference between the output signal of said first audio pickup unit and the output signal of said second audio pickup unit.

10. A method of controlling an audio processing apparatus including: a first audio pickup unit;

a second audio pickup unit including an audio resistor provided to cover a sound receiving portion to suppress external wind introduction while passing an external audio;

a first A/D converter that digitizes an output signal from the first audio pickup unit;

a second A/D converter that digitizes an output signal from the second audio pickup unit;

a level controller that controls at least one of a signal level of an output signal of the first A/D converter and a signal level of an output signal of the second A/D converter;

a first filter that attenuates a signal having a frequency lower than a first cutoff frequency of the output signal of the first A/D converter;

a third filter that attenuates a signal having a frequency higher than a second cutoff frequency of the output signal of the second A/D converter;

an adder that adds an output signal of the first filter and an output signal of the third filter to output an audio with reduced wind noise; and a second filter provided between the first audio pickup unit and the first A/D converter to attenuate a signal having a frequency lower than a third cutoff frequency for suppressing the wind noise, the method comprising:

controlling at least one of the signal level of the output signal of the first A/D converter and the signal level of the output signal of the second A/D converter; and mixing a high-frequency component having a frequency higher than the second cutoff frequency of the output signal of the first A/D converter whose signal level has been controlled and a low-frequency component having a frequency lower than the third cutoff frequency of the output signal of the second A/D converter whose signal level has been controlled, wherein the audio resistor suppresses the wind noise and acts as a structural low-pass filter for an audio other than the wind noise, and the first cutoff frequency is lower than a cutoff frequency of the structural low-pass filter.

* * * * *